United States Patent [19]

Garnier et al.

[11] Patent Number: 4,985,780

[45] Date of Patent: Jan. 15, 1991

[54] PORTABLE ELECTRONICALLY CONTROLLED LASER ENGRAVING MACHINE

[75] Inventors: Steven F. Garnier, Denver; John Doran, Littleton, both of Colo.

[73] Assignee: Melco Industries, Inc., Denver, Colo.

[21] Appl. No.: 333,102

[22] Filed: Apr. 4, 1989

[51] Int. Cl.⁵ .................. B23K 26/04; B23K 26/10
[52] U.S. Cl. .................. 358/299; 219/121.68; 219/121.78; 364/474.08
[58] Field of Search .................. 358/299; 219/121.67, 219/121.68, 121.78, 121.69; 364/474.08

[56] References Cited

U.S. PATENT DOCUMENTS

| | | | |
|---|---|---|---|
| 3,749,878 | 7/1973 | Sullivan | 219/121.68 |
| 3,761,675 | 9/1973 | Mason | 364/474.08 |
| 4,354,196 | 10/1982 | Neumann et al. | |

FOREIGN PATENT DOCUMENTS 2415513  9/1979  France ........................... 219/121.68

OTHER PUBLICATIONS

Product Literature of Laser Machining, Inc. of Somerset, Wis.

Product Literature of General Scanning of Watertown, Mass.

Primary Examiner—Mark J. Reinhart
Assistant Examiner—Scott A. Rogers
Attorney, Agent, or Firm—Sheridan, Ross & McIntosh

[57] ABSTRACT

A laser engraving apparatus is provided. The apparatus includes a laser device for outputting a laser beam. A workpiece to be engraved is positioned on a support member. To direct the laser beam to a predetermined position relative to the workpiece, the apparatus includes a beam delivery system. The beam delivery system includes a number of mirrors and a carriage assembly. The carriage assembly includes an X-carriage and a Y-carriage. These two carriages are moved to cause movement of two of the mirrors whereby the laser beam can be controllably and simultaneously positioned in both X and Y directions to engrave the workpiece. The components and location of the X and Y carriages relative to the workpiece and laser device, as well as to each other, result in a portable unit. The laser engraving apparatus is also modular in that it is able to communicate with a separate, independent controller for use in operating the apparatus to engrave any one of a number of selected, creative patterns.

20 Claims, 4 Drawing Sheets

Fig_1

Fig_2

Fig_3

Fig_4

Fig_5

Fig_6

Fig_7

Fig_8 ent invention. This application is hereby incorporated by reference.

PORTABLE ELECTRONICALLY CONTROLLED LASER ENGRAVING MACHINE

This application is related to U.S. Pat. Application Ser. No. 333,121, filed Apr. 4, 1989 and entitled "Laser Engraver With X-Y Assembly And Cut Control."

FIELD OF THE INVENTION

The present invention relates to laser engravers and particularly to a portable laser engraving machine adapted to be connected to an independent controller for engraving one or more selected patterns.

BACKGROUND OF THE INVENTION

In connection with engraving designs or other patterns on a workpiece such as, by way of example, metal, marble or wood, it is known to use a controlled laser beam. In U.S. Pat. No. 4,354,196 to Neumann et al. issued Oct. 12, 1982, and entitled "Laser Engraving System with Massive Base Table and Synchronization Controls," a laser engraving system is disclosed in which a carriage is provided for moving the workpiece to be engraved. This system also requires the use of two lasers, with one of the lasers being a reference laser. The system includes an extremely large and cumbersome platform, as well as beam delivery system, in order to deliver the laser beam to the movable workpiece.

Other known prior art systems appear to be equally cumbersome and unwieldy affording no portability to the user. In particular, an optical scanning laser engraving system is available from Laser Machining, Inc. of Somerset, Wis. This system, similar to the Neumann et al. system involves the use of a movable workpiece. It is a large and heavy system occupying a great deal of space and, consequently, could not be readily carried or transported by the user. The relationship and positioning of the laser, beam delivery system, workpiece and the carriage for moving the workpiece contribute to the immense size of the system. Another commercially available laser engraver can be obtained from General Scanning of Watertown, Mass. This engraver includes an elongated laser beam delivery system for directing the laser beam to the workpiece. Because of its length, this engraver is also unwieldy for the user to carry and transport.

In comparison with known prior art laser engraving systems, it would be advantageous to provide a portable laser engraver that can be used in a variety of applications and which can be readily transported by the user. It would also be desirable to provide such a system with the capability of communicating with an independent controller for use in providing a variety of patterns to be engraved on the workpiece and in which the cost of the engraver makes it available to a larger number of users.

SUMMARY OF THE INVENTION

A laser engraving apparatus is disclosed which can be provided as a portable unit to be carried by the user. The apparatus is adapted to be connected to an independent computer controller or system. The independent controller enables the user to utilize the apparatus in engraving any one of a number of design patterns, as well as characters including letters. The electronic hardware utilized in the present invention is disclosed in U.S. Pat. Application Ser. No. 333,121, filed Apr. 4, 1989, entitled "Laser Engraver With X-Y y And Cut Control" and assigned to the same assignee as the present invention. This application is hereby incorporated by reference.

The apparatus includes a support member on which components of the present invention are mounted or supported. A laser device is mounted to the support member and the laser device outputs a laser beam for engraving a workpiece located on another section of the support member. To direct the laser beam along a desired path, a beam delivery system is provided. The beam delivery system includes a number of light-reflecting mirrors and a carriage assembly. A first mirror receives the laser beam outputted from the laser device and changes the direction of the beam so that it is substantially perpendicular to the direction of the beam outputted by the laser device. A second mirror communicates with the reflected beam from the first mirror and directs the laser beam in a direction substantially parallel to the direction of the laser beam outputted by the laser device but in a direction opposite that from the direction of the beam outputted by the laser device. A third light reflecting mirror communicates with the light beam directed by the second mirror and changes the laser beam direction so that the laser beam is directed in a substantially perpendicular direction to the beam direction between the second and third mirrors. A fourth mirror is in the path of the light beam that impinges upon the third mirror and directs the laser beam downward into the path of a lens. The laser beam outputted by the lens is focused on the workpiece for engraving the same.

In connection with positioning the laser beam relative to the stationary workpiece to be engraved, the carriage assembly is controlled to move in predetermined distances in X and Y directions. Because the third and fourth mirrors move with the carriage assembly, the position of the laser beam relative to the workpiece can be controlled. More specifically, the carriage assembly includes an X-carriage, a Y-carriage and a carrier. The carrier is movable in the X direction. The third mirror is fixedly mounted to the carrier. The fourth mirror is supported by the carrier and is adapted to be movable relative to the carrier in the Y direction. Movement of the X-carriage results in movement of the third and fourth mirrors to position the laser beam in the first or X direction. Movement of the Y-carriage results in movement of the fourth mirror to permit predetermined positioning of the laser beam in the second or Y direction.

The X-carriage includes, in the preferred embodiment, a first ball screw and a first ball nut. The ball screw is coupled to a first servo motor. The ball nut is connected to the carrier. Upon activation or energization of the first servo motor, the first ball screw moves relative to the first ball nut to enable the carrier to move in the X direction. Depending upon the manner of energization of the first servo motor, the ball screw can be caused to rotate either clockwise or counterclockwise to thereby control movement in either the positive or the negative X direction. For definitional purposes only, movement of the carrier towards the first servo motor is defined as a positive X direction while movement of the carrier away from the first servo motor is defined as a negative X direction. As explained more fully in the aforesaid related U.S. patent application, an encoder communicates with the first servo motor to provide information concerning rotation of the ball screw and, concomitantly, movement of the carrier in the X direction, which information is used in positioning the carrier relative to the workpiece in the X direction. In connection with achieving the desired portable and compact size, the first ball screw is positioned substantially directly above the laser device and is substantially parallel relative thereto and the carrier is substantially perpendicular to the longitudinal extent of the laser device and the rolled ball screw of the X-carriage.

The Y-carriage includes a second ball screw and a second ball nut. The second ball screw is coupled to a second servo motor, which is mounted on the carrier. Whenever the second ball screw is caused to rotate, in a selected one of a clockwise and a counterclockwise direction, using the second servo motor, the ball nut, together with the fourth mirror, move in one of the positive and the negative Y direction. Movement of the fourth mirror in the Y direction results in movement of the fourth mirror relative to the workpiece whereby the position of the laser beam relative to the workpiece can be controlled in the Y direction. The second ball screw of the Y-carriage is disposed substantially perpendicular to the longitudinal extents of the laser device and the first ball screw associated with the X-carriage. The Y-carriage ball screw is mounted to the carrier and is substantially parallel to the length of the carrier. The majority of the length of the rolled ball screw of the Y-carriage is disposed directly above the workpiece.

In connection with controlling movement of the X-carriage and the Y-carriage by means of energization of the first and second servo motors, the apparatus includes electronic circuitry mounted on at least one printed circuit board. The circuit board is contained within the housing of the apparatus and is located at the back thereof. The circuit board communicates with an output plug for connection to a cable, which communicates with the independent computer controller.

In the preferred embodiment, the housing of the apparatus is supported on a cabinet. The housing itself has a footprint or length and width of about 2 feet by 2.5 feet, and with the height of the housing at its greatest being about 1 foot. The housing includes front, rear and side walls and an upper surface. The upper surface includes a hinged panel, which is pivotal to permit access by the user to the support member section supporting the workpiece whereby the workpiece can be positioned for engraving and removed after engraving. The upper surface also includes a control panel, which is used by the operator in conducting the necessary engraving steps. In the preferred embodiment, the portable apparatus, including the housing, weighs less than about 75 pounds, with the weight of the apparatus, apart from the housing, typically being about 25 pounds.

Based on the foregoing summary, a number of salient features of the present invention are readily discerned. A laser engraving apparatus is provided for communication with an independent computer controller to engrave a workpiece with one of any desired number of attractive patterns. The apparatus is preferably configured as a portable unit, which can be carried by the user, if desired, to a suitable location. Because of its construction, the laser device can be provided as a subassembly wherein the laser is tested and aligned apart from the assembly of most other components of the apparatus. As a consequence, safety precautions are enhanced in connection with the assembly of the laser device. That is, the laser device can be assembled in a relatively more safe and secure location and then transported to another assembly location where the remaining components of the apparatus are assembled. Because of the unique beam delivery system, the workpiece to be engraved remains stationary so that, if desired, different sizes and geometric shapes of workpieces can be conveniently engraved. Furthermore, the design of components associated with the beam delivery system and their relative locations in the housing significantly contribute to the overall portable and compact nature of the unit.

Additional advantages of the present invention will become readily apparent from the following discussion, particularly when taken in conjunction with the accompanying drawings.

DETAILED DESCRIPTION

Figure 1:
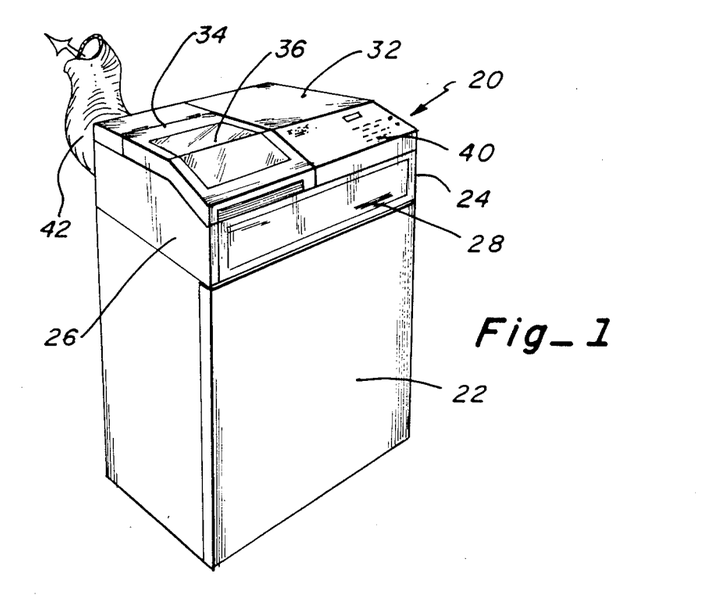
FIG. 1 is a perspective view of the housing of the present invention supported on a cabinet.

In accordance with the present invention, a laser engraving apparatus is provided for engraving a workpiece with a desired pattern. With reference to FIG. 1, the laser engraving apparatus 20 is preferably raised or supported on a cabinet 22, which can include storage space for materials or other items used in the engraving process. The apparatus 20 itself includes an outer shell or housing 24 comprising side walls 26 and front and rear walls 28, 30, respectively. An upper surface 32 overlies the walls 26, 28, 30 and includes a hinged cover 34, which enables the user to gain access to the inside of the housing 24 in order to properly position or remove the workpiece to be engraved. In the preferred embodiment, the cover 34 includes a translucent section 36 by which the user is able to view or inspect the engraving work being done on the workpiece. Also part of the upper surface 32 is a housing panel 40 having a number of control buttons or switches, together with an LCD display, which switches can be activated by the user in connection with the engraving process. In the embodiment illustrated, a corrugated hose 42 is also provided, adjacent to the area of the housing having the workpiece, for carrying away smoke or other gases and debris that might be generated as a result of the engraving process. With respect to the portable embodiment disclosed, the apparatus 20 weighs less than 50 pounds and is typically about 25 pounds. The length of the housing 24 along the side wall 26 is about 2 feet, the width of the housing 24 along the longitudinal extent of the front and rear walls 28, 30 is about 2.5 feet and the height of the housing from the bottom of the housing 24 to the highest point of the upper surface 32 is about 1 foot. From these dimensions, it can be readily appreciated that the apparatus 20 is a compact laser engraving apparatus capable of readily being moved and carried by the user.

With reference particularly to FIGS. 2-5, the mechanical assemblies and their components for providing the engraving operation are illustrated. Specifically, the apparatus 20 includes a laser device 44 fixedly held to a support member or bottom floor 46. The laser device 44 is a commercially available laser available, for example, from Synrad, Inc. of Bothell, Wash. Fans 50 are provided adjacent to the front wall 28 of the housing 24 for cooling the laser device 44 during operation, when it is activated or energized. The laser device 44 outputs a laser beam 52. The laser beam 52 is directed to a beam delivery system 56 which includes a mirror arrangement 58, which is comprised of a number of mirrors, and a carriage assembly 60, which includes two carriages.

Figure 6:
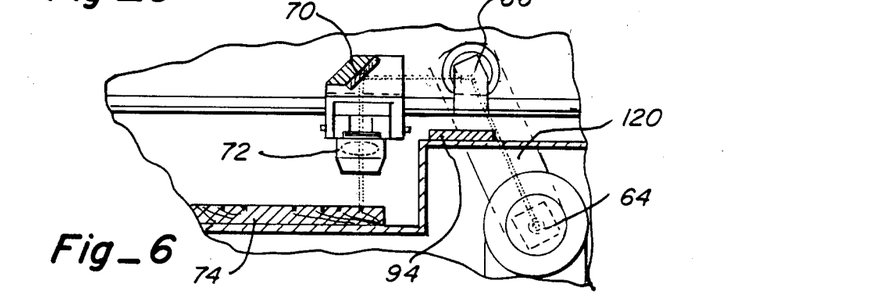
FIG. 6 is a fragmentary, lateral section, taken along lines 6—6 of FIG. 4, illustrating further details of the fourth mirror receiving reflected light from the third mirror and directing it through the lens to the workpiece.

In particular, the mirror arrangement 58 includes a first light reflecting mirror 64, which receives or communicates with the laser beam 52 outputted by the laser device 44. The mirror 64 is disposed substantially at a 45° angle relative to the laser beam 52 impinging thereon so as to direct the laser beam in a direction substantially perpendicular to the direction of the laser beam 52 outputted by the laser device 44. The laser beam 52 directed by the first mirror 64 is incident upon a second mirror 66, which is disposed substantially at a 45° angle relative to the laser beam 52, which impinges upon the second mirror 66. Upon receipt of the laser beam 52, the second mirror 66 causes the laser beam 52 to be directed substantially perpendicular to the direction of the laser beam between the first and second mirrors 64, 66. Consequently, the direction of the laser beam 52 from the second mirror 66 is substantially parallel to the direction of the laser beam 52 outputted by the laser device 44. A third mirror 68 receives the laser beam 52 directed by the second mirror 66 and is also disposed at a substantially 45° angle relative to the direction of the laser beam 52. As a consequence, the laser beam 52 is caused to be directed once again in a direction substantially perpendicular to the direction of the laser beam 52 outputted by the laser device 44. From the third mirror 68, the laser beam 52 is received by a fourth mirror 70. With reference to FIG. 6 also, the fourth mirror 70 is disposed at a 45° angle to direct the laser beam 52 in a downward direction towards the support member 46 where it is received by a lens 72. The lens 72 focuses the laser beam 52 and outputs or passes the laser beam 52 to a desired or predetermined position on a workpiece 74. As can be appreciated, the laser beam 52 causes a burning or cutting of the workpiece 74, particularly through the upper surface thereof.

In connection with positioning the laser beam 52 relative to the workpiece 74, the carriage assembly 60 of the beam delivery system 56 includes an X-carriage 78 and a Y-carriage 80. The X-carriage 78 is used in moving a carrier 82 of the carriage assembly 60 in a selected one of first or positive and second or negative X directions. For definitional purposes, the X direction is a straight line direction between the front and rear walls 28, 30, with the first or positive direction being a movement of the carrier 82 in a direction from the front wall 28 to the rear wall 30 and a negative direction being movement of the carrier 82 from the rear wall 30 to the front wall 28.

Figure 5:
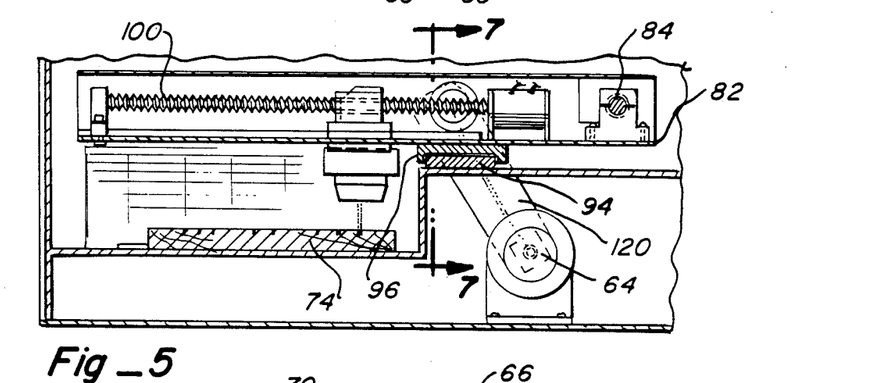
FIG. 5 is a fragmentary, lateral section, taken along lines 5—5 of FIG. 4, showing the laser beam being directed from the lens to the workpiece and forming cuts or burns therein.

In the preferred embodiment, the X-carriage 78 includes a ball screw 84 extending across the majority of the distance between the front and rear walls 28, 30. The ball screw 84 is located substantially vertically above the laser device 44 and is substantially parallel to the length of the laser device 44. A ball nut 86 operatively engages portions or threads of the ball screw 84. The ball nut 86 is connected to the carrier 82 whereby rotation of the ball screw 84 relative to the ball nut 86 causes the carrier 82 to move. Rotation of the ball screw 84 is caused by a first servo motor 88, which is coupled to one end of the ball screw 84 relatively adjacent to the rear wall 30. The first servo motor 88 includes an encoder for use in providing information concerning the position of the carrier 82, which encoder and its operation is described in the aforesaid related U.S. patent application. The opposite end of the ball screw 84 terminates adjacent to the front wall 28 and is supported by mounting member 90. As can be readily understood, the ball screw 84 can be caused to rotate in a selected one of a counterclockwise and a clockwise direction. The direction of rotation is controlled by energization of the first servo motor 88. A first energization of the first servo motor 88 causes a clockwise rotation of the ball screw 84, while a second energization causes a counterclockwise rotation. When the ball screw 84 rotates in a clockwise direction, the carrier is caused to move in either the positive or negative X direction, while the counterclockwise rotation causes the carrier 82 to move in the opposite X direction. The X-carriage 78 also includes an X-track 94 that extends lengthwise between the front and rear walls 28, 30, about the same distance as does the ball screw 84. The carrier 82 is able to move along the X-track 94 using an X-guide member 96, as best seen in FIG. 5, which is connected to the bottom of the carrier 82. Consequently, as the ball screw 84 rotates relative to the ball nut 86, the guide 96, which is attached to the carrier 82, moves along the track 94.

With regard to the Y-carriage 80, like the X-carriage 78, it includes a ball screw 100 that is rotatable relative to a ball nut 102. Unlike the ball nut 86, associated with the X-carriage 78, the ball nut 102 moves relative to the carrier 82. That is, the ball nut 102 is able to move in positive and negative directions substantially perpendicular to the movement of the carrier 82. Such movement enables the fourth mirror 70 to be located at a desired position in the Y direction. One end of the ball screw 100 is coupled to a second servo motor 104, while the opposite end thereof terminates at a mounting member 106. For definitional purposes, rotation of the ball screw in a predetermined one of a clockwise or counter-clockwise results in a positive Y directional movement of the ball nut 102 from the mounting member 106 towards the second servo motor 104. Conversely, the opposite rotation of the ball screw 100 results in movement of the ball nut 102 in a negative Y direction from the second servo motor 104 towards the mounting member 106. The fourth mirror 70 is operably connected to the ball nut 102 and is also connected to a guide piece 108, which moves along a Y-track 110. The Y-track 110 extends lengthwise along the carrier 82 and is connected to the carrier 82. Consequently, as the second servo motor 104 rotates the ball screw 100 and causes movement of the ball nut 102, the guide piece 108 moves relative to the Y-track 110 and desirably positions the fourth mirror 70 relative to the workpiece 74.

Figure 2:
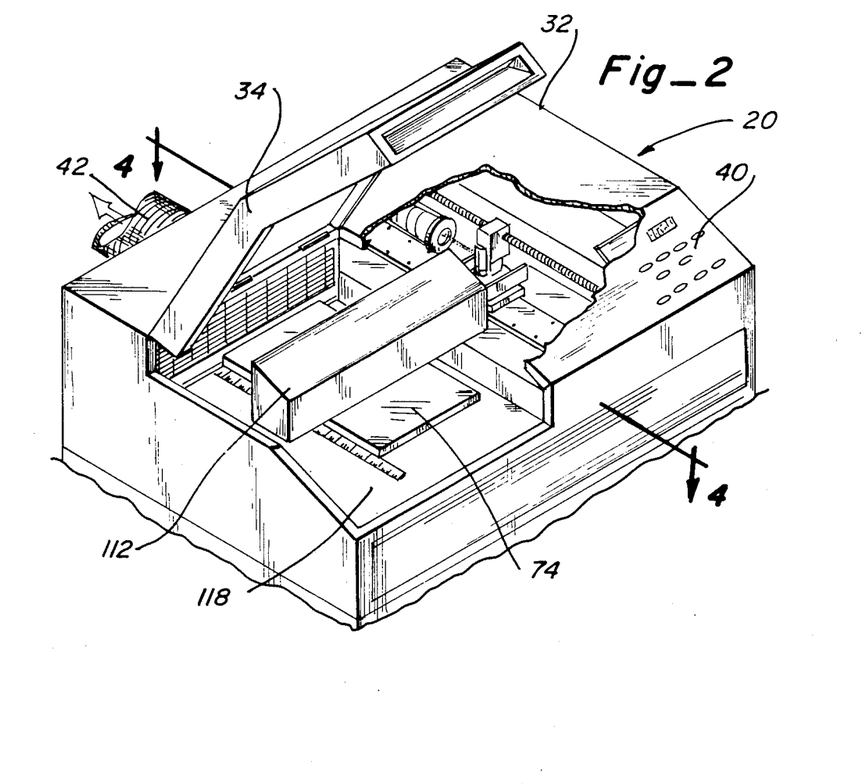
FIG. 2 is a perspective view of the housing of the apparatus, with the hinged top cover opened and part of the upper surface cut away to show the workpiece and the carriage assembly.
Figure 3:
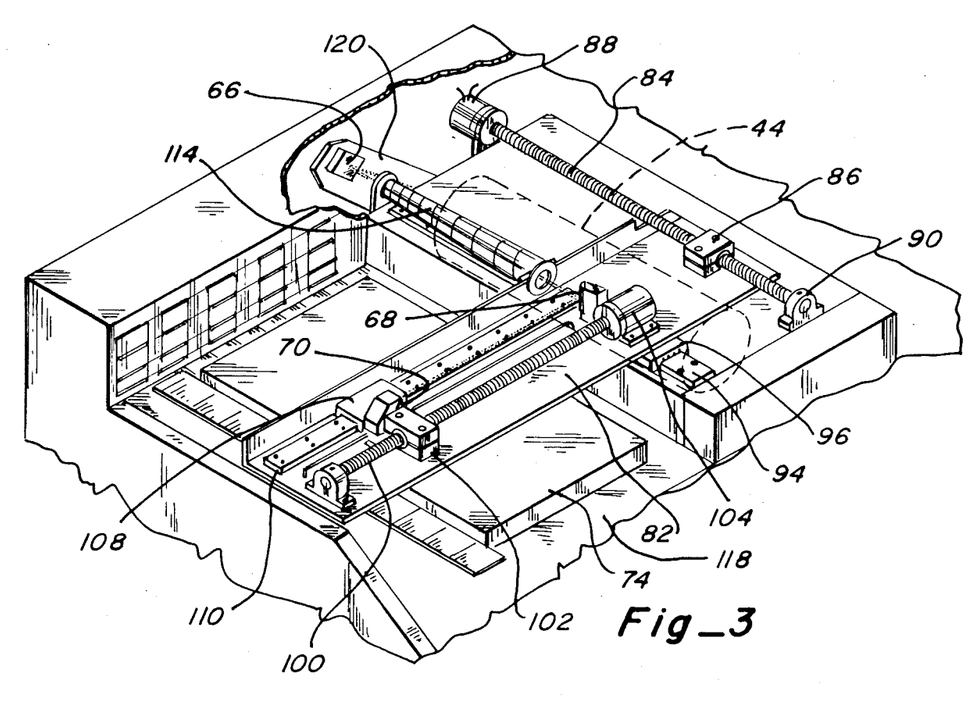
FIG. 3 is a perspective view of the beam delivery system with the housing removed and also showing the output plug and cable.
Figure 4:
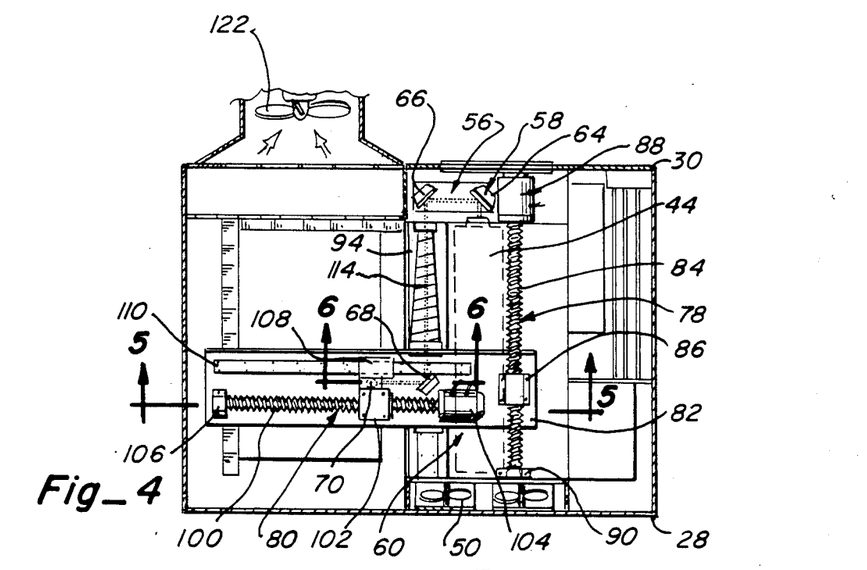
FIG. 4 is a top plan view, taken along lines 4—4 of FIG. 2, illustrating the beam delivery system including the mirrors and X and Y carriages.
Figure 7:
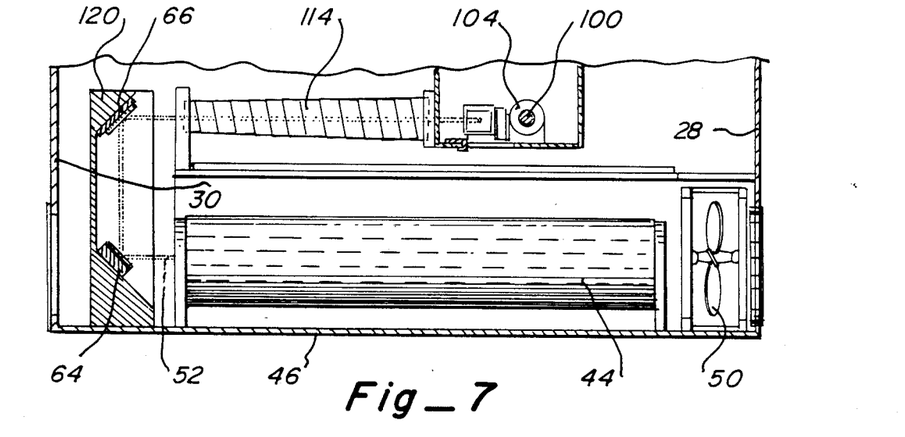
FIG. 7 is a lateral section, taken along lines 7—7 of FIG. 5, showing the first and second mirrors and the laser beam being directed using the mirrors.
Figure 8:
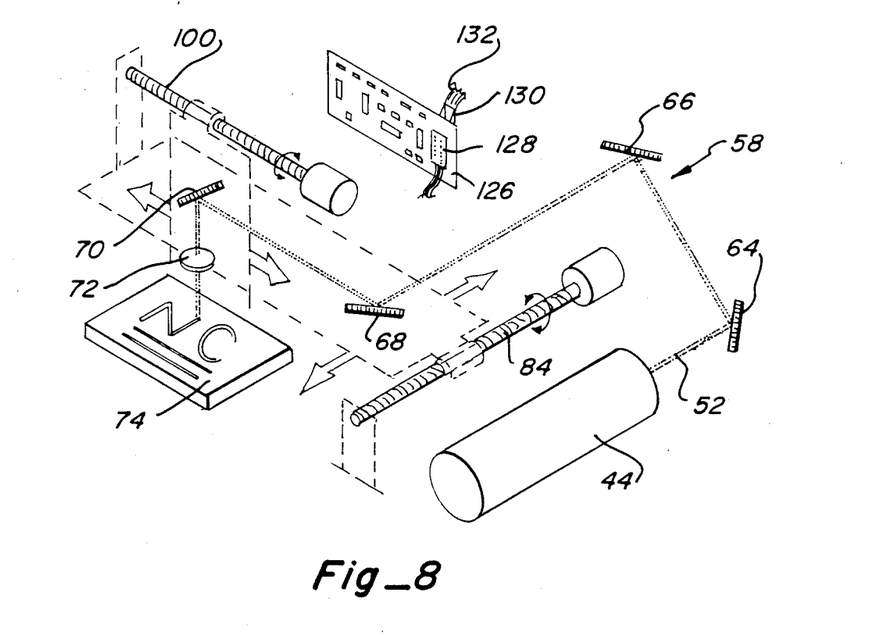
FIG. 8 is a schematic representation of the direction of the laser beam and the control of the X and Y carriages during engraving.

In the preferred embodiment, the ball screw 100, associated with the Y-carriage 80, and other components of the beam delivery system 56 associated therewith, are surrounded by a casing 112, as illustrated in FIG. 2. As seen in FIG. 7, a laser beam shield 114 is also provided between the second and third mirrors 66, 68, respectively, to prevent exposure of the laser beam during its traverse of the path between these two mirrors 66, 68. As also seen in FIG. 4, the second servo motor 104 is mounted to the carrier 82 and the majority of the length of the rolled ball screw 100 extends over a support section 118 that underlies the workpiece 74.

With regard to the first and second mirrors 64, 66, respectively, they are disposed on a mounting plate 120, which is located at an angle relative to the direction of the laser beam 52, outputted by the laser device 44, as illustrated in FIGS. 5 and 6. In connection with assembling the first and second mirrors 64, 66, the assembler is able to adjust one or both of the positions of the mirrors 64, 66 so that the laser beam 52 accurately impinges upon the precise point or area on each of these two mirrors whereby the laser beam 52 is accurately directed to the third mirror 68. Consequently, whenever adjustment of the path of the laser beam 52 is required, the positions of these two mirrors 64, 66 can be modified until the desired path is achieved. As also illustrated in FIG. 4, a smoke or other debris extracting fan 122 is provided adjacent to the rear wall 30 of the housing 24 and behind the workpiece 74 to draw smoke or other gases and particles from the apparatus 20, which are generated during the engraving process.

In connection with the operation and control of the apparatus 20, and with reference also to FIG. 7, the apparatus includes a printed circuit board 126 having a number of electrical components mounted thereon and an outlet connector 128. The electrical circuitry is described in the aforesaid related patent application. An output plug 130 communicates with the outlet connector 128 and the plug 130 includes cable 132 with electrical conducting wires. As previously pointed out, the cable 132 connects to or communicates with an independent computer controller, which is used in providing information relating to a desired pattern to be engraved. In operation, in accordance with the disclosure in the aforesaid related U.S. patent application, the laser beam 52 is caused to be directed to predetermined positions relative to the workpiece 74 whereby the laser beam cuts or burns the workpiece 74 to create the desired or predetermined pattern thereon. More particularly, the laser device 44 is energized and the laser beam 52 is modulated and directed to the first mirror 64. The laser beam 52 traverses the pathways between the first and second mirrors 64, 66, the second and third mirrors 66, 68, and the third and fourth mirrors 68, 70 where the laser beam 52 is then directed downward by the fourth mirror 70 through the focusing lens 72. The laser beam 52 delivered from the lens 72 comes in contact with the workpiece 74 and causes a burn or cut to create a portion of the desired pattern.

In connection with adjusting the position of the laser beam 52 relative to the stationary workpiece 74 in order to create additional portions of the desired pattern, the control electronics circuitry, together with the information provided by the independent computer controller, causes the necessary and desired energization of the first and second servo motors 88, 104, respectively. That is, the controlled energization of the servo motors causes the ball screws 84, 100, associated with the first and second servo motors 88, 104, respectively, to rotate in either a clockwise or counterclockwise direction. Depending upon the direction of rotation of the ball screw 84, the carrier 82 is caused to move in either a positive or negative X direction. Similarly, depending upon the direction of rotation of the ball screw 100, the ball nut 102 is caused to move in either a positive or negative Y direction. As can be appreciated, movement of the carrier 82 in one of the two X directions causes engraving of the desired pattern portions in a direction between the front and rear walls 28, 30 of the housing 24 while movement of the ball nut 102 relative to the ball screw 100 causes pattern portions to be created in a direction between the side walls 26 of the housing 28. As can be readily understood, the X and Y carriages 78, 80 can be caused to move simultaneously to create the desired pattern. As should also be readily appreciated, because of the precise control of the rotation of the ball screws 84, 100, highly accurate patterns of various shapes and appearances and having a high degree of artistic quality can be produced.

In addition to the precise and compact nature associated with the laser engraver and its operation, the component parts thereof can be relatively easily and safely assembled. In particular, because of the typical concern of safety when a laser device is utilized, the present invention is devised so as to enable the laser device to be incorporated as a subassembly. That is, in assembling the apparatus 20, the laser device 44 can be first affixed to the support member 46 before assembly of the remaining components or assemblies of the apparatus 20. Once fixed in position, the laser device 44 can be tested and aligned by the assembler to obtain proper operation before the next steps of the assembly process are conducted. In that regard, the laser device 44 can be provided at an assembly location different from the location at which the other components of the apparatus 20 are assembled. Consequently, the laser device 44 can be assembled in a relatively more safe and secure area without noticeably disrupting or delaying the assembly of the apparatuses of the present invention.

Based on the foregoing detailed description, a number of worthwhile advantages can be easily recognized. A laser engraver is provided for creating highly artistic and accurate predetermined designs and which can be built as a portable unit adaptable to be carried by the user. The engraver is modular in that it can be readily connected to an independent computer controller for inputting the predetermined pattern information for use during the engraving process. Because of this modularity, the cable interconnecting the laser engraver and the independent controller can be made relatively long so that the portable and modular laser engraver can be carried to any one of a great number of desired locations. Because of the unique layout of the mechanical and electrical components associated with the engraver, the laser device of the apparatus can be provided as a subassembly thereby enhancing safety during the assembly, aligning and testing of the laser device. Precise and accurate positioning of the laser beam is accomplished by the interrelationship of the X and Y carriages of the present invention. Relatedly, the positioning of such carriages greatly contributes to the compact and portable nature of the engraver. Additionally, because the workpiece is stationary and the position of the laser beam is movable, different shapes and sizes of workpieces can be used for engraving and less cumbersome hardware for achieving the desired movement of the laser beam is utilized.

The foregoing description of the invention has been presented for purposes of illustration and description. Further, the description is not intended to limit the invention to the form disclosed therein. Consequently, variations and modifications commensurate with the above teachings, and the skill or knowledge in the relevant art are within the scope of the present invention. The embodiment described hereinabove is further intended to explain the best mode known of practicing the invention and to enable others skilled in the art to utilize the invention in such, or other embodiments, and with the various modifications required by their particular applications or uses of the invention. It is intended that the appended claims be construed to include alternative embodiments to the extent permitted by the prior art.

what is claimed is:

1. A laser engraving apparatus for engraving a stationary workpiece and in which the apparatus is able to be carried by the user and having an outlet for connection to a cable that communicates with an independent computer controller, comprising:
    laser means for providing a laser beam;
    beam delivery means including carriage assembly means movable in X and Y directions for positioning the laser beam;
    support means for supporting a workpiece, wherein the workpiece is stationary during engraving thereof using said laser beam;
    electronic means for controlling at least one of said carriage assembly and said laser beam during engraving of the workpiece; and
    housing means for containing said laser means, said beam delivery means and said electronic means, said housing means including a length and a width forming a substantially rectangular shape and in which said laser means, beam delivery means, support means, electronic means and housing means together weigh less than about 75 pounds to provide a portable apparatus.

2. An apparatus, as claimed in claim 1, wherein: said laser means is a single laser.

3. An apparatus, as claimed in claim 1, wherein:
    said carriage assembly means includes an X-carriage and a Y-carriage and wherein one of said X-carriage and a Y-carriage extends in a direction substantially parallel to said laser means.

4. An apparatus, as claimed in claim 1, wherein:
    said carriage assembly means includes an X-carriage and a Y-carriage and wherein one of said x-carriage and said Y-carriage extends in a direction substantially perpendicular to said laser means.

5. An apparatus, as claimed in claim 3, wherein:
    said carriage assembly means includes a carrier having a longitudinal extent substantially perpendicular to said laser means.

6. An apparatus, as claimed in claim 5, wherein:
    said X-carriage includes an X-track and said carrier includes a guide member and wherein said guide member is movable along said X-track during movement of said carrier in an X direction.

7. An apparatus, as claimed in claim 5, wherein:
    said Y-carriage includes a Y-track connected to said carrier and a guide member movable along said Y-track.

8. An apparatus, as claimed in claim 1, wherein:
    said beam delivery means includes a first mirror receiving said laser beam from said laser means, a second mirror for receiving said laser beam from said first mirror in a direction substantially perpendicular to the direction of said laser beam from said laser means, a third mirror for receiving said laser beam in a direction substantially parallel to the direction of said laser beam outputted from said laser means, and a fourth mirror for receiving said laser beam from said third mirror and directing said laser beam in a downwardly direction towards the workpiece.

9. An apparatus, as claimed in claim 1, wherein:
    said housing means includes a number of walls and a cover portion that is movable for accessing the workpiece.

10. An apparatus, as claimed in claim 1, wherein:
    said support means includes a support section on which said laser means is held to provide said laser means as a subassembly, wherein said laser means is adapted to be tested and aligned without said beam delivery means being an assembled part of the apparatus.

11. An apparatus, as claimed in claim 1, wherein:
    said electronic means includes a circuit board having outlet means for connection to a cable extending exteriorly of said housing means and wherein said cable is adapted to be connected to a computer controller for providing information to the apparatus to be used in engraving a predetermined pattern on the workpiece.

12. A laser engraving apparatus for engraving a stationary workpiece, comprising:
    laser means for providing a laser beam;
    beam delivery means including carriage assembly means movable in X and Y directions for positioning the laser beam, said carriage assembly means including a X-carriage and a Y-carriage and wherein one of said X-carriage and said Y-carriage extends in a direction substantially parallel to said laser means, said X-carriage including an elongated first ball screw extending in a direction substantially parallel to the longitudinal extent of said laser means and being disposed vertically above said laser means;
    support means for supporting a workpiece, wherein the workpiece is stationary during engraving thereof using said laser beam;
    electronic means for controlling at least one of said carriage assembly and said laser beam during engraving of the workpiece; and
    housing means for containing said laser means, said beam delivery means and said electronic means.

13. An apparatus, as claimed in claim 12, wherein:
    said Y-carriage includes an elongated second ball screw extending in a direction substantially perpendicular to said support means and being disposed vertically above said support means.

14. A laser engraving apparatus for engraving a stationary workpiece, comprising:
    laser means for providing a laser beam;
    beam delivery means including carriage assembly means movable in X and Y directions for positioning the laser beam, said carriage assembly means including a X-carriage and a Y-carriage and wherein one of said X-carriage and said Y-carriage extends in a direction substantially parallel to said laser means, said carriage assembly means including a carrier having a longitudinal extent substantially perpendicular to said laser means, said X-carriage including a first ball screw and a first ball nut and said Y-carriage including a second ball screw and a second ball nut and wherein said first ball nut is connected to said carrier and said second ball nut is supported by said carrier and is movable relative to said carrier;

support means for supporting a workpiece, wherein the workpiece is stationary during engraving thereof using said laser beam;

electronic means for controlling at least one of said carriage assembly and said laser beam during engraving of the workpiece; and housing means for containing said laser beam, said beam delivery means and said electronic means.

15. A laser engraving apparatus for engraving a stationary workpiece, comprising:

laser means for providing a laser beam;

beam delivery means including carriage assembly means movable in X and Y directions for positioning the laser beam, said beam delivery means including mirror means and said carriage assembly including a ball screw, with at least portions of said mirror means being operatively associated with said ball screw to move in response to rotation of said ball screw;

support means for supporting a workpiece, wherein the workpiece is stationary during engraving thereof using said laser beam;

electronic means for controlling at least one of said carriage assembly and said laser beam during engraving of the workpiece; and housing means for containing said laser means, said beam delivery means and said electronic means.

16. A laser engraving apparatus for engraving a stationary workpiece, comprising:

laser means for providing a laser beam;

beam delivery means including carriage assembly means movable in X and Y directions for positioning the laser beam, said beam delivery means including first, second, third and fourth mirrors and said carriage assembly means including a X-carriage, a Y-carriage and a carrier, wherein said first and second mirrors are fastened to a mounting plate disposed at an angle relative to said laser beam outputted from said laser means, said third and fourth mirrors are supported by said carrier with said third mirror being fixedly connected to said carrier and said fourth mirror being movable relative to said carrier and in which said third and fourth mirrors are moved in a X direction when said X-carriage is moved and said fourth mirror is moved when said Y-carriage is moved in a Y direction;

support means for supporting a workpiece, wherein the workpiece is stationary during engraving thereof using said laser beam;

electronic means for controlling at least one of said carriage assembly and said laser beam during engraving of the workpiece; and housing means for containing said laser means, said beam delivery means and said electronic means.

17. A laser engraving apparatus for engraving a stationary workpiece, comprising:

laser means for providing a laser beam;

beam delivery means including carriage assembly means movable in X and Y directions for positioning the laser beam, said carriage assembly means including a X-carriage having a first ball screw and a Y-carriage having a second ball screw and wherein said first ball screw is substantially vertically above and parallel to said laser means and said second ball screw is substantially vertically above the workpiece, with said second ball screw being substantially perpendicular to said first ball screw;

support means for supporting a workpiece, wherein the workpiece is stationary during engraving thereof using said laser beam;

electronic means for controlling at least one of said carriage assembly and said laser beam during engraving of the workpiece; and housing means for containing said laser beams, said beam delivery means and said electronic means.

18. A laser engraving apparatus for engraving a workpiece, comprising:

laser means for providing a laser beam;

mirror means communicating with said laser beam for directing said laser beam along a desired path to the workpiece;

X-carriage means for controlling the position of said laser beam in a X direction, said X-carriage means including a first ball screw and a first ball nut;

Y-carriage means for controlling the position of said laser beam in a Y direction, said Y-carriage means including a second ball screw and a second ball nut; and carrier means movable in said X direction, said first ball nut being fixedly connected to said carrier means and said second ball nut being supported by said carrier means for movement relative to said carrier means in a Y direction;

wherein said mirror means includes a plurality of mirrors and wherein at least one of said mirrors is fixedly connected to said carrier means and another of said mirrors is supported by said carrier means and is movable relative to said carrier means in said Y direction using said Y-carriage means.

19. An apparatus, as claimed in claim 18, wherein: said first ball screw is substantially parallel to said laser means and positioned vertically above said laser means.

20. An apparatus, as claimed in claim 18, wherein: said second ball screw is substantially perpendicular to said first ball screw and the majority of said second ball screw extends directly above the workpiece.

* * * * *